(12) United States Patent
Wang et al.

(10) Patent No.: US 11,830,413 B2
(45) Date of Patent: Nov. 28, 2023

(54) METHOD, DEVICE FOR PROCESSING IMAGE, AND SYSTEM

(71) Applicant: XI'AN NOVASTAR TECH CO., LTD., Shaanxi (CN)

(72) Inventors: Wenbo Wang, Shaanxi (CN); Dan Han, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 0 days.

(21) Appl. No.: 17/608,758

(22) PCT Filed: Mar. 31, 2020

(86) PCT No.: PCT/CN2020/082607
§ 371 (c)(1),
(2) Date: Nov. 4, 2021

(87) PCT Pub. No.: WO2021/196037
PCT Pub. Date: Oct. 7, 2021

(65) Prior Publication Data
US 2023/0013582 A1    Jan. 19, 2023

(51) Int. Cl.
*G09G 3/20*    (2006.01)
*G09G 3/32*    (2016.01)
(Continued)

(52) U.S. Cl.
CPC ......... *G09G 3/2096* (2013.01); *G06T 3/4092* (2013.01); *G06T 9/00* (2013.01);
(Continued)

(58) Field of Classification Search
CPC .... G09G 3/2096; G09G 3/32; G09G 2340/02; G09G 2340/0421; G09G 2360/18;
(Continued)

(56) References Cited

U.S. PATENT DOCUMENTS 9,459,825 B2 * 10/2016 Tahan ........................ G06F 3/14
10,402,445 B2 * 9/2019 Newman ............... H04N 1/2158
(Continued)

FOREIGN PATENT DOCUMENTS

CN    102665056 A    9/2012
CN    103152540 A    6/2013
(Continued)

OTHER PUBLICATIONS

Image coding by folding, Zhu et al, IEEE Jan. 1997, pp. 665-668.*
(Continued)

*Primary Examiner* — Vijay Shankar
(74) *Attorney, Agent, or Firm* — Gang Yu (57) ABSTRACT

Disclosed is a method and device for processing Image, and an image transmitting system. The method includes that: data to be transmitted are processed according to a first resolution to obtain first image data, wherein the image resolution represented by each row of image data in the first image data is the first resolution, and the first resolution is the maximum resolution set by a system; and the first image data is folded to obtain second image data, wherein the number of rows of the second image data is greater than that of the first image data, the image resolution represented by each row of image data in the second image data is a second resolution, and the second resolution is less than the first resolution.

15 Claims, 4 Drawing Sheets

(51) Int. Cl.
  *G06T 3/40* (2006.01)
  *G06T 9/00* (2006.01)
(52) U.S. Cl.
  CPC ............ *G09G 3/32* (2013.01); *G06T 2200/16* (2013.01); *G09G 2340/02* (2013.01); *G09G 2340/0421* (2013.01); *G09G 2360/18* (2013.01)
(58) Field of Classification Search
  CPC ..... G06T 3/4092; G06T 9/00; G06T 2200/16; H04N 5/262; H04N 7/01; H04N 7/0117
  See application file for complete search history.

(56) References Cited

U.S. PATENT DOCUMENTS

| | | | |
|---|---|---|---|
| 2007/0055134 A1* | 3/2007 | Fuderer | G01R 33/5611 600/420 |
| 2014/0184626 A1 | 7/2014 | Narayanan et al. | |
| 2015/0237382 A1 | 8/2015 | Nishida et al. | |
| 2016/0007008 A1* | 1/2016 | Molgaard | H04N 23/45 348/47 |
| 2019/0012332 A1* | 1/2019 | Newman | H04N 23/661 |

FOREIGN PATENT DOCUMENTS

| | | |
|---|---|---|
| CN | 104461432 A | 3/2015 |
| CN | 109101233 A | 12/2018 |
| CN | 109448633 A | 3/2019 |
| CN | 110136644 A | 8/2019 |
| CN | 110166792 A | 8/2019 |
| CN | 110223631 A | 9/2019 |

OTHER PUBLICATIONS

Liu, Quan et al. "Implementation of Controlling System for Super₀ Long LED Panel". Chinese Journal of I, iquid Crystals and Displays. vol. 23, No. 6. Dec. 15, 2008.
International Search Report for corresponding application PCT/CN2020/082607 filed Mar. 31, 2020; dated Dec. 28, 2020.

* cited by examiner

Back shoulder | Valid data in row with the maximum load (3840 pixels) |

Back shoulder | Folded valid data in row (1920 pixels) | Front shoulder + Sync header

Fig. 3

| SurfaceFlinger (An image is rendered according to the size of the frame buffer) | Framebuffer Resolution: 3840*540 | LCDC Output resolution: 1920*1080 |

# METHOD, DEVICE FOR PROCESSING IMAGE, AND SYSTEM

CROSS-REFERENCE TO RELATED APPLICATION

The disclosure claims priority to International Patent Application No. PCT/CN2020/082607, filed to the International Bureau, WIPO on Mar. 31, 2020 and entitled "Method, device for processing Image, and system", the disclosure of which is hereby incorporated by reference in its entirety.

TECHNICAL FIELD

The disclosure relates to the application field of image technology, and in particular to a method and device for processing Image, and an image transmitting system.

BACKGROUND

In a related Light Emitting Diode (LED) display technology, ultra-long display is widely used in large screen display scenarios, especially in seamless splicing scenarios of spliced screen. Due to the arbitrary ductility of an LED display screen, ultra-long seamless splicing is realized, but for ultra-long display, this requires a higher resolution of a player.

The related LED display system includes: a multimedia player box, a Field Programmable Gate Array (FPGA) sending card, a FPGA receiving card and an LED display screen. The multimedia player box is composed of an application processor, a memory, storage and the Android system. The Android system is used for decoding and playing a multimedia file and rendering a display effect, so as to provide high-quality images. Here, at an output end of the multimedia player box, image data rendered by the Android system are converted in time sequence through an LCD Controller (LCDC) and are sent to the FPGA sending card through a RGB interface. The FPGA sending card parses the image data converted in time sequence, saves valid data and transmits the data to the FPGA receiving card through Ethernet, so that the FPGA receiving card drives the LED display screen for display.

However, due to the limitation of resolution of the application processor in the multimedia player box, the image data output by the application processor is sent to the FPGA receiving card through the FPGA sending card, so when the image data is finally displayed by the LED display screen, high-resolution images cannot be displayed due to the limitation of load.

In a related art, because an ultra-long resolution video signal cannot be output due to the limitation of performance of a chip in the media player box, some cheap multimedia player boxes cannot carry ultra-long loads, but for ultra-long display scenarios, customers use a player box that can carry longer loads with high cost, and a low-cost player box cannot meet the actual requirements.

For the problem that because the ultra-long resolution video signal cannot be output due to the limitation of performance of the chip in the media player box in the related art, and the cost of using the player box with longer loads is high, a common media player box cannot meet the demand on ultra-long display, no effective solution has been proposed yet.

SUMMARY

According to an aspect of the embodiments of the disclosure, a method for processing Image is provided, which may include that: data to be transmitted are processed according to a first resolution to obtain first image data, the image resolution represented by each row of image data in the first image data being the first resolution, and the first resolution being the maximum resolution set by a system; and the first image data is folded to obtain second image data, the number of rows of the second image data being greater than that of the first image data, the image resolution represented by each row of image data in the second image data being a second resolution, and the second resolution being less than the first resolution.

Optionally, the sum of the image resolutions represented by every n rows of image data in the second image data is equal to the first resolution, where n is a positive integer greater than or equal to 2.

Optionally, that the data to be transmitted is processed according to the first resolution to obtain the first image data may include that: the resolution of a frame buffer is set to the first resolution; layer overlapping is performed on the data to be transmitted according to the first resolution to obtain the first image data; and the first image data is stored to the frame buffer.

Optionally, that layer overlapping is performed on the data to be transmitted according to the first resolution to obtain the first image data may include that: at least two frames of data to be transmitted are obtained; and image rendering is performed on each row of image data in the at least two frames of data to be transmitted according to the first resolution to obtain the first image data, the image resolution represented by each row of image data in which is the first resolution.

Optionally, that the first image data is folded to obtain the second image data may specifically include that: 1/n of the length of the first resolution and n times the height of the first resolution are obtained to obtain the second resolution; and the first image data are extracted according to the second resolution to obtain the second image data, the image resolution represented by which is the second resolution; or 1/n of the height of the first resolution and n times the length of the first resolution are obtained to obtain the second resolution; and the second image data, the image resolution represented by which is the second resolution is extracted from the first image data according to the second resolution.

Optionally, the method may further include that: every n rows of image data in the second image data are spliced to restore the data to the first image data, and the first image data after restoration are sent.

Optionally, that every n rows of image data in the second image data are spliced to restore the data to the first image data may specifically include that: valid data in each row of the image data in the second image data are stored to a memory; the valid data in each row of the image data are obtained according to a preset row relationship to obtain at least one group of n rows of interrelated valid data; and the n rows of interrelated valid data in each group are combined into one row, and the first image data, the image resolution represented by which is the first resolution, are obtained through restoration.

Optionally, that the n rows of interrelated valid data in each group are combined into one row may specifically include: the n times the length and 1/n of the height of the second resolution are obtained to obtain the first resolution; and the n rows of interrelated valid data in each group are extracted according to the first resolution to obtain a row of image data, the image resolution represented by which is the first resolution; or, the 1/n of the length and n times the height of the second resolution are obtained to obtain the first resolution; and the n rows of interrelated valid data in each group are extracted according to the first resolution to obtain a row of image data, the image resolution represented by which is the first resolution.

According to an aspect of the embodiments of the disclosure, another method for processing Image is provided, which may include that: the first image data is received, the image resolution represented by each row of image data in the first image data being the first resolution, and the first resolution being the maximum resolution set by the system; the first image data are decoded to obtain the first image data to be displayed; and the first image data are displayed.

Optionally, that the first image data are decoded to obtain the first image data to be displayed may include that: the first image data are decoded to obtain decoded image data, the image resolution represented by each row of image data in which is the first resolution; and the decoded image data are sorted according to a time sequence to obtain the first image data to be displayed.

According to another aspect of the embodiments of the disclosure, a device for processing image is provided, which may include an image processing module and a splitting module. The image processing module is configured to process the data to be transmitted according to the first resolution to obtain the first image data. The image resolution represented by each row of image data in the first image data is the first resolution, and the first resolution is the maximum resolution set by the system. The splitting module is configured to fold the first image data to obtain the second image data. The number of rows of the second image data is greater than that of the first image data, the image resolution represented by each row of image data in the second image data is the second resolution, and the second resolution is less than the first resolution.

Optionally, the sum of the image resolutions represented by every n rows of image data in the second image data is equal to the first resolution, where n is a positive integer greater than or equal to 2.

Optionally, the image processing module may include: a setting unit, configured to set the resolution of the frame buffer to the first resolution; an image processing unit, configured to perform layer overlapping on the data to be transmitted according to the first resolution to obtain the first image data; and a storing unit, configured to store the first image data to the frame buffer.

Optionally, the image processing unit may include: an obtaining subunit, configured to obtain at least two frames of data to be transmitted; and an image processing subunit, configured to perform image rendering on each row of image data in the at least two frames of data to be transmitted according to the first resolution to obtain the first image data, the image resolution represented by each row of image data in which is the first resolution.

Optionally, the splitting module may include: a first resolution obtaining unit, configured to obtain 1/n of the length of the first resolution and n times the height of the first resolution to obtain the second resolution; and a first splitting unit, configured to extract the second image data, the image resolution represented by which is the second resolution, from the first image data according to the second resolution. Or, the splitting module may include: a second resolution obtaining unit, configured to obtain 1/n of the height of the first resolution and n times the length of the first resolution to obtain the second resolution; and a second splitting unit, configured to extract the second image data, the image resolution represented by which is the second resolution, from the first image data according to the second resolution.

Optionally, the device may include: a sending module, configured to splice every n rows of image data in the second image data to restore the data to the first image data, and send the first image data after restoration.

Optionally, the sending module may include: a storing unit, configured to store the valid data in each row of the image data in the second image data to the memory; a data obtaining unit, configured to obtain the valid data in each row of the image data according to the preset row relationship to obtain at least one group of n rows of interrelated valid data; and a restoring unit, configured to combine the n rows of interrelated valid data in each group into one row, and obtain through restoration the first image data, the image resolution represented by which is the first resolution.

Optionally, the restoring unit may include: a first resolution obtaining subunit, configured to obtain the n times the length and 1/n of the height of the second resolution to obtain the first resolution; and a first extracting subunit, configured to extract the n rows of interrelated valid data in each group according to the first resolution to obtain a row of image data, the image resolution represented by which is the first resolution. Or, the restoring unit may include: a second resolution obtaining subunit, configured to obtain the 1/n of the length and n times the height of the second resolution to obtain the first resolution; and a second extracting subunit, configured to extract the n rows of interrelated valid data in each group according to the first resolution to obtain a row of image data, the image resolution represented by which is the first resolution.

According to another aspect of the embodiments of the disclosure, another device for processing image is provided, which may include: a receiving module, a decoding module, and a displaying module. The receiving module is configured to receive the first image data. The image resolution represented by each row of image data in the first image data is the first resolution, and the first resolution is the maximum resolution set by the system. The decoding module is configured to decode the first image data to obtain the first image data to be displayed. The displaying module is configured to display the first image data.

Optionally, the decoding module may include: a decoding unit, configured to decode the first image data to obtain the decoded image data, the image resolution represented by each row of image data in which is the first resolution; and a sorting unit, configured to sort the decoded image data according to a time sequence to obtain the first image data to be displayed.

According to yet another aspect of the embodiments of the disclosure, an image transmitting device is provided, which may include: a display controller and a sending card. The display controller is configured to process the data to be transmitted according to the first resolution to obtain the first image data, and fold the first image data to obtain the second image data. The image resolution represented by each row of image data in the first image data is the first resolution, and the first resolution is the maximum resolution set by the system. The number of rows of the second image data is greater than that of the first image data, the image resolution represented by each row of image data in the second image data is the second resolution, and the second resolution is less than the first resolution. The sending card is connected to the display controller and configured to splice every n rows of image data in the second image data to restore the data to the first image data, and send the first image data after restoration.

Optionally, that the first image data are obtained may specifically include that: the resolution of the frame buffer is set to the first resolution; layer overlapping is performed on the data to be transmitted according to the first resolution to obtain the first image data; and the first image data is stored to the frame buffer.

According to yet another aspect of the embodiments of the disclosure, an image transmitting system is provided, which may include: a multimedia player box and a display device. The multimedia player box may include: a display controller and a sending card. The display controller is configured to process the data to be transmitted according to the first resolution to obtain the first image data, and fold the first image data to obtain the second image data. The image resolution represented by each row of image data in the first image data is the first resolution, and the first resolution is the maximum resolution set by the system. The number of rows of the second image data is greater than that of the first image data, the image resolution represented by each row of image data in the second image data is the second resolution, and the second resolution is less than the first resolution. The sending card is connected to the display controller and configured to splice every n rows of image data in the second image data to restore the data to the first image data, and send the first image data after restoration. The display device may include: a receiving card and a display. The receiving card is configured to receive the first image data, and decode the first image data to obtain the first image data to be displayed. The image resolution represented by each row of image data in the first image data is the first resolution, and the first resolution is the maximum resolution set by the system. The display is connected to the receiving card and configured to display the first image data.

According to another aspect of the embodiments of the disclosure, a non-transitory storage medium is provided, which may include a stored program. When running, the program controls a device where the non-transitory storage medium is to execute the above method for processing Image.

According to another aspect of the embodiments of the disclosure, a processor is provided, which is configured to run a program stored in a storage medium. When running, the program executes the above method for processing Image.

BRIEF DESCRIPTION OF THE DRAWINGS

The accompanying drawings described here are used for providing further understanding of the disclosure, and constitute a part of the disclosure. Schematic embodiments of the disclosure and description thereof are used for illustrating the disclosure and not intended to form an improper limit to the disclosure. In the accompanying drawings.

DETAILED DESCRIPTION OF THE EMBODIMENTS

In order to make those skilled in the art understand the solutions of the disclosure better, the technical solutions in the embodiments of the disclosure are clearly and completely elaborated below in combination with the accompanying drawings. It is apparent that the described embodiments are only a part of the embodiments of the disclosure but not all. Based on the embodiments of the disclosure, all the other embodiments obtained by those of ordinary skill in the art on the premise of not contributing creative effort should belong to the protection scope of the disclosure.

It is to be noted that the terms like "first" and "second" in the specification, claims and accompanying drawings of the disclosure are used for differentiating the similar objects, but do not have to describe a specific order or a sequence. It should be understood that the objects may be exchanged under appropriate circumstances, so that the embodiments of the disclosure described here may be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

First Embodiment

According to the embodiments of the disclosure, an embodiment of a method for processing Image is provided. It is to be noted that these steps presented in the flowchart of the accompanying drawings can be executed in a computer system like a group of computer executable instructions, and moreover, although a logical sequence is shown in the flowchart, in some cases, the presented or described steps can be performed in a sequence different from that described here.

Figure 1:
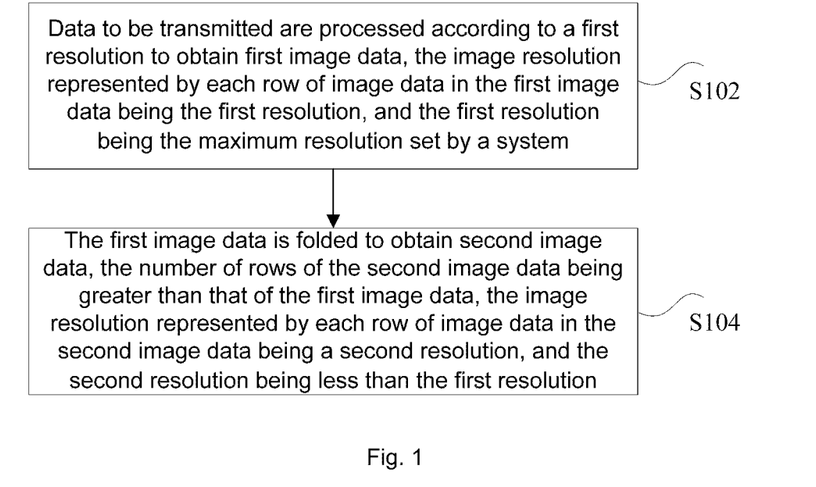
FIG. 1 is a schematic diagram of a method for processing Image according to the first embodiment of the disclosure.

FIG. 1 is a schematic diagram of a method for processing Image according to the first embodiment of the disclosure. As shown in FIG. 1, on the side of a multimedia player box, the method includes the following steps.

At S102, data to be transmitted are processed according to a first resolution to obtain first image data. The image resolution represented by each row of image data in the first image data is the first resolution, and the first resolution is the maximum resolution set by a system.

Figure 2:
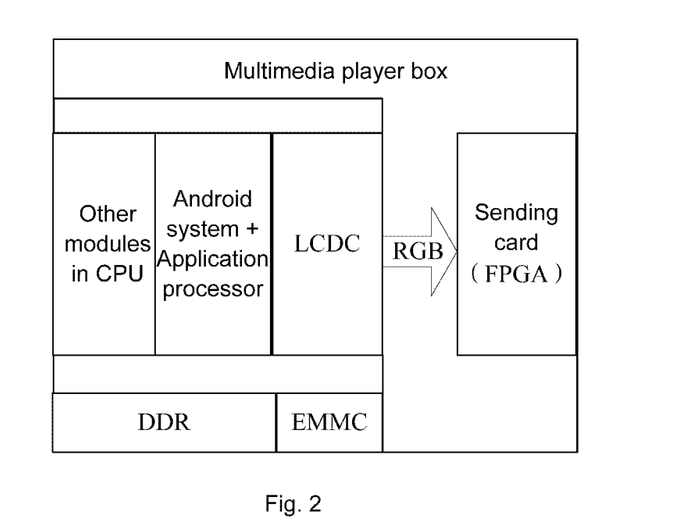
FIG. 2 is a schematic diagram of a multimedia player box in a method for processing Image according to the first embodiment of the disclosure.

In S102, the method for processing Image provided by the embodiments of the disclosure may be applied to the multimedia player box. The multimedia player box is composed of the Android system, an application processor, a display controller, a sending card, other modules in CPU, a memory and storage. FIG. 2 is a schematic diagram of the multimedia player box in the method for processing Image according to the first embodiment of the disclosure. As shown in FIG. 2, in the embodiments of the disclosure, the memory is marked as a Double Data Rate (DDR) synchronous dynamic random access memory, the storage is marked as an Embedded Multi Media Card (EMMC), the display controller is marked as an LCDC, and the sending card is marked as a FPGA sending card.

The multimedia player box processes the data to be transmitted according to the first resolution to obtain the image data, the resolution of which is the first resolution (that is, the first image data in the embodiments of the disclosure). By setting the maximum resolution in a frame buffer of the Android system, the data to be transmitted are rendered at the maximum resolution to obtain the image data, the resolution of which is the first resolution.

For example, the conventional Android system only supports an internal resolution of 1920×1080, but it can be rendered according to 3840×540 in the frame buffer, so the data to be transmitted is rendered from the resolution of 1920×1080 to the resolution of 3840×540 by setting the maximum resolution, where 3840×540 is the first resolution provided in the embodiments of the disclosure, and 1920×1080 is the second resolution in the embodiments of the disclosure.

It is to be noted that the data to be transmitted in the embodiments of the disclosure may be image data. The image data includes: text, characters, landscapes, cartoons and other pictures and videos except text.

At S104, the first image data is folded to obtain second image data. The number of rows of the second image data is greater than that of the first image data, the image resolution represented by each row of image data in the second image data is a second resolution, and the second resolution is less than the first resolution.

In S104, the multimedia player box processes, through the LCDC, the data to be transmitted at the first resolution obtained in S102 to obtain the second image data. The number of rows of the second image data is greater than that of the first image data, the image resolution represented by each row of image data in the second image data is the second resolution, and the second resolution is less than the first resolution.

Optionally, the sum of the image resolutions represented by every n rows of image data in the second image data is equal to the first resolution, where n is a positive integer greater than or equal to 2.

Figure 3:
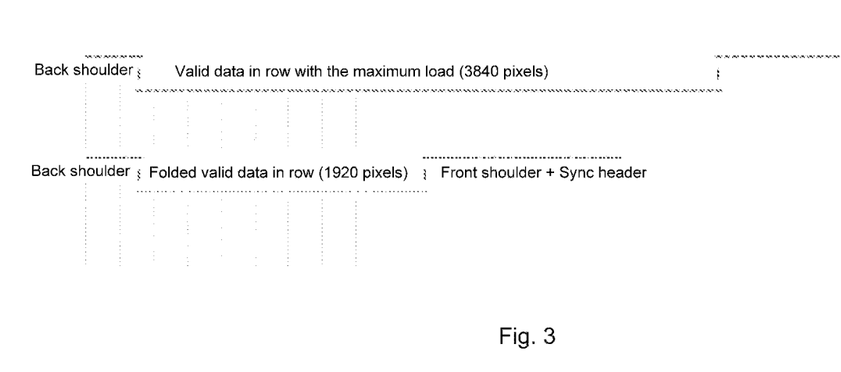
FIG. 3 is a schematic diagram of splitting a first resolution into a second resolution in a method for processing Image according to the first embodiment of the disclosure.

For example, because the LCDC only supports 1920×1080, in order to achieve ultra-long display, FIG. 3 is a schematic diagram of splitting the first resolution into the second resolution in the method for processing Image according to the first embodiment of the disclosure. As shown in FIG. 3, the LCDC of the multimedia player box splits the data to be transmitted with a resolution of 3840×540 into two rows of image data with a resolution of 1920×1080. When the LCDC splits the data to be transmitted with the resolution of 3840×54, in order to ensure the correct display of the data to be transmitted, the LCDC splits the data to be transmitted with the original resolution of 3840×540 according to a time sequence to obtain two rows of image data with the resolution of 1920×1080.

Because the image displayed on an LED display screen is composed of multiple rows of image data, when each row of the data to be transmitted with the resolution of 3840×540 is processed, it is split into two rows of image data with the resolution of 1920×1080, so that a display device restores an image to be transmitted during display, and combines two rows of the image data with the resolution of 1920×1080 into one row of the data to be transmitted with the resolution of 3840×540, so as to achieve ultra-long display.

In the embodiments of the disclosure, by processing the data to be transmitted according to the first resolution to obtain the first image data, the image resolution represented by each row of image data in the first image data being the first resolution, and the first resolution being the maximum resolution set by the system, and folding the first image data to obtain the second image data, the number of rows of the second image data being greater than that of the first image data, the image resolution represented by each row of image data in the second image data being the second resolution, and the second resolution being less than the first resolution, the purpose of realizing ultra-long loads through a common media layer box is achieved, thereby achieving the technical effect of reducing device costs, and then solving the technical problem that because an ultra-long resolution video signal cannot be output due to the limitation of performance of a chip in the media player box in the related art, and the cost of using a player box which can carry longer loads is high, a common media player box cannot meet the demand on ultra-long display.

Optionally, that the data to be transmitted is processed according to the first resolution to obtain the first image data in S102 includes that: the resolution of the frame buffer is set to the first resolution; layer overlapping is performed on the data to be transmitted according to the first resolution to obtain the first image data; and the first image data is stored to the frame buffer.

Optionally, that layer overlapping is performed on the data to be transmitted according to the first resolution to obtain the first image data includes that: at least two frames of data to be transmitted are obtained; and image rendering is performed on each row of image data in the at least two frames of data to be transmitted according to the first resolution to obtain the first image data, the image resolution represented by each row of image data in which is the first resolution.

Optionally, that the first image data is folded to obtain the second image data in S104 specifically includes that: 1/n of the length of the first resolution and n times the height of the first resolution are obtained to obtain the second resolution; and the first image data are extracted according to the second resolution to obtain the second image data, the image resolution represented by which is the second resolution; or 1/n of the height of the first resolution and n times the length of the first resolution are obtained to obtain the second resolution; and the second image data, the image resolution represented by which is the second resolution, is extracted from the first image data according to the second resolution.

Figure 4:
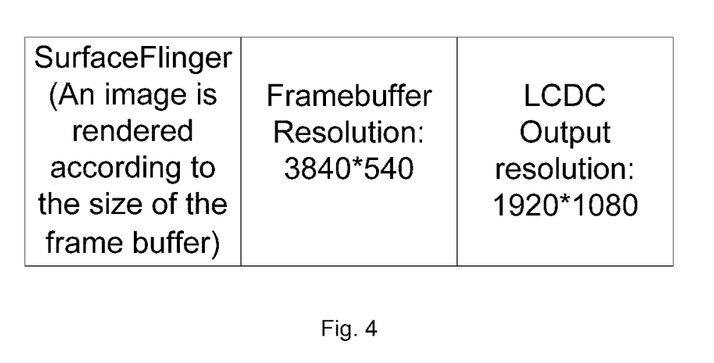
FIG. 4 is a schematic diagram of outputting in half after doubling the resolution in a method for processing Image according to the first embodiment of the disclosure.

In an optional implementation mode, FIG. 4 is a schematic diagram of outputting in half after doubling the resolution in the method for processing Image according to the first embodiment of the disclosure. As shown in FIG. 4, in the embodiments of the disclosure, taking that the version of the Android system is android5.1 for example, by setting the resolution of the frame buffer of the Android system to 3840×540, an upper layer composition unit (SurfaceFlinger) renders and processes (for example, layer overlapping) the image according to the resolution 3840×540 of the frame buffer, and then saves a frame of rendered image in the frame buffer (for example, a video memory). Next, the LCDC generates the data to be transmitted according to a half of the length and two times the height of the resolution of the frame buffer (1920×1080).

Based on the above, as shown in FIG. 3, assuming that the chip itself can only output the maximum resolution of 1920×1080, the processed image data of 3840×540 are folded and output (taking only one row as an example).

Optionally, the method for processing Image provided by the embodiments of the disclosure further includes the following steps.

At S106, every n rows of image data in the second image data are spliced to restore the data to the first image data, and the first image data after restoration are sent.

Optionally, that every n rows of image data in the second image data are spliced to restore the data to the first image data in S106 specifically includes that: valid data in each row of the image data in the second image data are stored to a memory; the valid data in each row of the image data are obtained according to a preset row relationship to obtain at least one group of n rows of interrelated valid data; and the n rows of interrelated valid data in each group are combined into one row, and the first image data, the image resolution represented by which is the first resolution, are obtained through restoration.

Optionally, that the n rows of interrelated valid data in each group are combined into one row specifically includes: the n times the length and 1/n of the height of the second resolution are obtained to obtain the first resolution; and the n rows of interrelated valid data in each group are extracted according to the first resolution to obtain a row of image data, the image resolution represented by which is the first resolution; or, the 1/n of the length and n times the height of the second resolution are obtained to obtain the first resolution; and the n rows of interrelated valid data in each group are extracted according to the first resolution to obtain a row of image data, the image resolution represented by which is the first resolution.

In S106, based on the second image data obtained in S104, as shown in FIG. 4, the second image data is restored through the FPGA sending card, that is, two rows of the second image data are combined into one row of the image data, the resolution of which is the first resolution, and the image data at the first resolution are sent to the display device, so that the display device achieves the ultra-long display according to the image data, the resolution of which is the first resolution.

For example, the FPGA sending card collects two rows of the image data with the resolution of 1920×1080, which are output by the LCDC, each time, splices the 1920 pixels collected in each of the two rows into 3840 pixels, thereby achieving the effect and function of doubling the resolution.

To sum up, in combination with S102 to S106, the method for processing Image provided by the embodiments of the disclosure may be applied to ultra-long display scenarios, such as a strip LED display above a bank window. The related ultra-long display is limited by the load of the original multimedia player box itself, that is, the player that can carry a load of only 1920 pixels in length can only display 1920 pixels, which limits the display length of the LED display screen, so in order to overcome this, the traditional art can only use a high-cost multimedia player box that can carry longer loads, but cannot effectively solve the problem of how to achieve the ultra-long display in the case of fixed load.

In an optional implementation mode, a video signal received by the FPGA sending card is data to be transmitted of 1920×1080, but the data to be transmitted of 1920×1080 is folded data to be transmitted of 3840×540. The FPGA sending card receives the first row of data to be transmitted and saves the valid data signal in the memory, then saves the valid data of the second row of data to be transmitted in the memory, and splices the two rows of signals together to achieve a row of 3840 pixels. The third row and the fourth row are processed in turn in the same way. Finally, the sending card transmits the restored data to be transmitted with the resolution of 3840×540 to the receiving card through Ethernet for display.

It is to be noted that the method for processing Image provided by the embodiments of the disclosure is illustrated only taking transmission over Ethernet as a preferred example. In addition, LAN transmission and short-distance transmission are also supported to transmit the data to be transmitted, which are restored to the first resolution, to the display device, which is subject to implementing the image transmitting method provided in the embodiments of the disclosure, without any specific restrictions.

The method for processing Image provided in the embodiments of the disclosure sets the maximum resolution in the Android system, so that the multimedia player, which originally supports the length of 1920 pixels, renders the data to be transmitted through the frame buffer according to the maximum resolution to obtain the data to be transmitted with the length of 3840 pixels. But because the LCDC of the multimedia player only supports data extraction and timing conversion with the length of 1920 pixels, in order to ensure that the data to be transmitted with the length of 3840 pixels can be output smoothly, the data to be transmitted with the length of 3840 pixels are split into two rows of data with the length of 1920 pixels, thereby overcoming the problem of limited display of the LED display screen due to the load limitation of hardware devices.

Because the data are split into two rows of data with the length of 1920 pixels at the LCDC, in order to achieve the ultra-long display on the LED display screen (that is, the display device in the embodiments of the disclosure), two rows of data with the length of 1920 pixels are combined through FPGA to obtain the data to be transmitted with the length of 3840 pixels, and the data to be transmitted with the length of 3840 pixels are sent to the display device, so as to achieve the effect of doubling the resolution and the function of LED ultra-long display.

It is to be noted that the embodiments of the disclosure are illustrated only taking the multimedia player box, the chip in which supports the resolution 1920×1080, as an example. In addition, the multimedia player box, the chip in which supports the resolution 4096×2160 (that is, 4K definition) is also applicable to the method for processing Image provided in the embodiments of the disclosure. If the method for processing Image provided in the embodiments of the disclosure is used, the resolution can be improved to 8192×1080, so the method for processing Image provided in the embodiments of the disclosure is only illustrated with the above example, which is subject to implementing the method for processing Image provided in the embodiments of the disclosure, without any specific restrictions.

Second Embodiment

Figure 5:
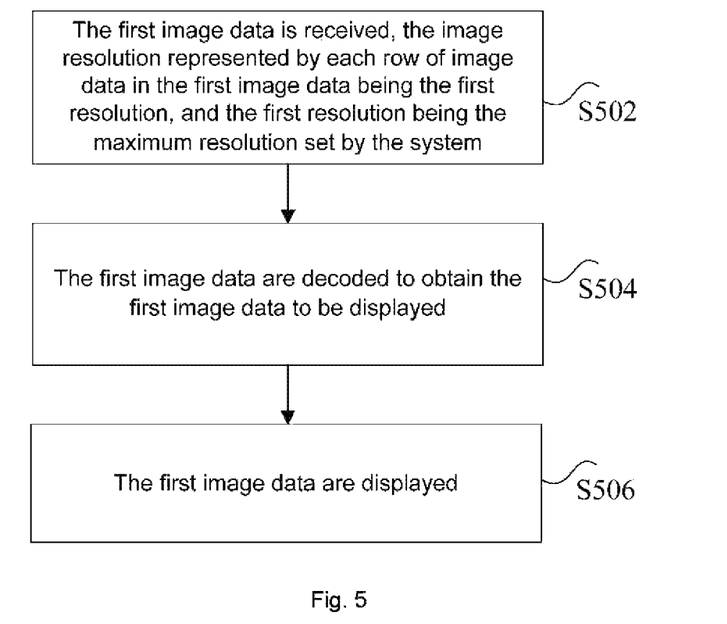
FIG. 5 is a schematic diagram of a method for processing Image according to the second embodiment of the disclosure.

According to an aspect of the embodiments of the disclosure, another method for processing Image is provided. FIG. 5 is a schematic diagram of the method for processing Image according to the second embodiment of the disclosure. As shown in FIG. 5, on the side of the receiving card, the method for processing Image includes the following steps.

At S502, the first image data is received. The image resolution represented by each row of image data in the first image data is the first resolution, and the first resolution is the maximum resolution set by the system.

At S504, the first image data are decoded to obtain the first image data to be displayed.

At S506, the first image data are displayed.

Optionally, that the first image data are decoded to obtain the first image data to be displayed in S504 includes that: the first image data are decoded to obtain decoded image data, the image resolution represented by each row of image data in which is the first resolution; and the decoded image data are sorted according to the time sequence to obtain the first image data to be displayed.

In an optional implementation mode, corresponding to the example of the multimedia player box in the first embodiment, after receiving the data to be transmitted with the length of 3840 pixels, the FPGA receiving card in the display device decodes the data to be transmitted with the length of 3840 pixels, and sorts the decoded data to be transmitted with the length of 3840 pixels according to the time sequence, so as to ensure the normal display of the LED display screen.

In the embodiments of the disclosure, by receiving the first image data, the image resolution represented by each row of image data in the first image data being the first resolution, and the first resolution being the maximum resolution set by the system, decoding the first image data to obtain the first image data to be displayed, and displaying the first image data, the purpose of realizing ultra-long loads through the common media layer box is achieved, thereby achieving the technical effect of reducing device costs, and then solving the technical problem that because an ultra-long resolution video signal cannot be output due to the limitation of performance of a chip in the media player box in the related art, and the cost of using the player box which can carry longer loads is high, the common media player box cannot meet the demand on ultra-long display.

Embodiment 3

Figure 6:
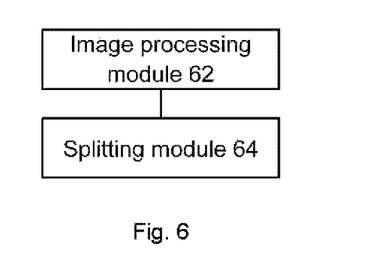
FIG. 6 is a schematic diagram of a device for processing image according to the third embodiment of the disclosure.

According to another aspect of the embodiments of the disclosure, a device for processing image is provided. FIG. 6 is a schematic diagram of a device for processing image according to the third embodiment of the disclosure. As shown in FIG. 6, on the side of the multimedia player box, the device for processing image includes: an image processing module 62 and a splitting module 64. The image processing module 62 is configured to process the data to be transmitted according to the first resolution to obtain the first image data. The image resolution represented by each row of image data in the first image data is the first resolution, and the first resolution is the maximum resolution set by the system. The splitting module 64 is configured to fold the first image data to obtain the second image data. The number of rows of the second image data is greater than that of the first image data, the image resolution represented by each row of image data in the second image data is the second resolution, and the second resolution is less than the first resolution.

Optionally, the sum of the image resolutions represented by every n rows of image data in the second image data is equal to the first resolution, where n is a positive integer greater than or equal to 2.

Optionally, the image processing module 62 includes: a setting unit, configured to set the resolution of the frame buffer to the first resolution; an image processing unit, configured to perform layer overlapping on the data to be transmitted according to the first resolution to obtain the first image data; and a storing unit, configured to store the first image data to the frame buffer.

Optionally, the image processing unit includes: an obtaining subunit, configured to obtain at least two frames of data to be transmitted; and an image processing subunit, configured to perform image rendering on each row of image data in the at least two frames of data to be transmitted according to the first resolution to obtain the first image data, the image resolution represented by each row of image data in which is the first resolution.

Optionally, the splitting module 64 includes: a first resolution obtaining unit, configured to obtain 1/n of the length of the first resolution and n times the height of the first resolution to obtain the second resolution; and a first splitting unit, configured to extract the second image data, the image resolution represented by which is the second resolution, from the first image data according to the second resolution. Or, the splitting module 64 includes: a second resolution obtaining unit, configured to obtain 1/n of the height of the first resolution and n times the length of the first resolution to obtain the second resolution; and a second splitting unit, configured to extract the second image data, the image resolution represented by which is the second resolution, from the first image data according to the second resolution.

Optionally, the device for processing image provided by the embodiments of the disclosure includes: a sending module, configured to splice every n rows of image data in the second image data to restore the data to the first image data, and send the first image data after restoration.

Optionally, the sending module includes: a storing unit, configured to store the valid data in each row of the image data in the second image data to the memory; a data obtaining unit, configured to obtain the valid data in each row of the image data according to the preset row relationship to obtain at least one group of n rows of interrelated valid data; and a restoring unit, configured to combine the n rows of interrelated valid data in each group into one row, and obtain through restoration the first image data, the image resolution represented by which is the first resolution.

Optionally, the restoring unit includes: a first resolution obtaining subunit, configured to obtain the n times the length and 1/n of the height of the second resolution to obtain the first resolution; and a first extracting subunit, configured to extract the n rows of interrelated valid data in each group according to the first resolution to obtain a row of image data, the image resolution represented by which is the first resolution. Or, the restoring unit includes: a second resolution obtaining subunit, configured to obtain the 1/n of the length and n times the height of the second resolution to obtain the first resolution; and a second extracting subunit, configured to extract the n rows of interrelated valid data in each group according to the first resolution to obtain a row of image data, the image resolution represented by which is the first resolution.

Embodiment 4

Figure 7:
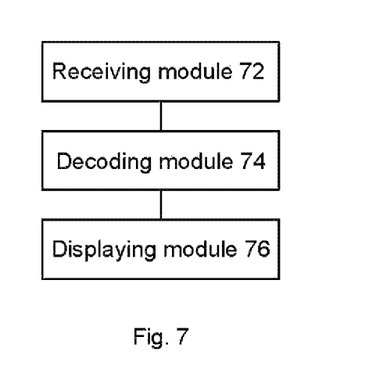
FIG. 7 is a schematic diagram of a device for processing image according to the fourth embodiment of the disclosure.

According to another aspect of the embodiments of the disclosure, another device for processing image is provided. FIG. 7 is a schematic diagram of a device for processing image according to the fourth embodiment of the disclosure. As shown in FIG. 7, on the side of the receiving card, the device for processing image includes: a receiving module 72, a decoding module 74, and a displaying module 76. The receiving module 72 is configured to receive the first image data. The image resolution represented by each row of image data in the first image data is the first resolution, and the first resolution is the maximum resolution set by the system. The decoding module 74 is configured to decode the first image data to obtain the first image data to be displayed. The displaying module 76 is configured to display the first image data.

Optionally, the decoding module 74 includes: a decoding unit, configured to decode the first image data to obtain the decoded image data, the image resolution represented by each row of image data in which is the first resolution; and a sorting unit, configured to sort the decoded image data according to a time sequence to obtain the first image data to be displayed.

Fifth Embodiment

According to yet another aspect of the embodiments of the disclosure, an image transmitting device is provided. As shown in FIG. 2, the image transmitting device includes: a display controller and a sending card. The display controller is configured to process the data to be transmitted according to the first resolution to obtain the first image data, and fold the first image data to obtain the second image data. The image resolution represented by each row of image data in the first image data is the first resolution, and the first resolution is the maximum resolution set by the system. The number of rows of the second image data is greater than that of the first image data, the image resolution represented by each row of image data in the second image data is the second resolution, and the second resolution is less than the first resolution. The sending card is connected to the display controller and configured to splice every n rows of image data in the second image data to restore the data to the first image data, and send the first image data after restoration.

Optionally, that the first image data are obtained specifically includes that: the resolution of the frame buffer is set to the first resolution; layer overlapping is performed on the data to be transmitted according to the first resolution to obtain the first image data; and the first image data is stored to the frame buffer.

Sixth Embodiment

Figure 8:
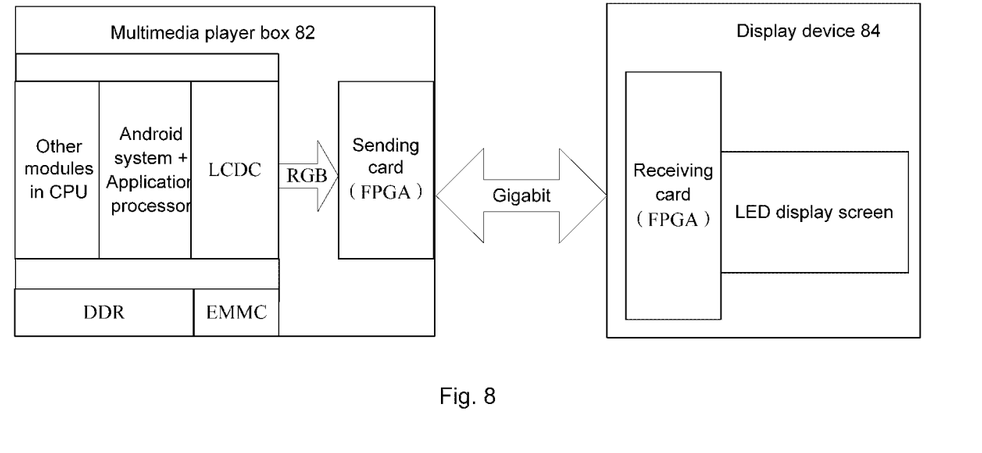
FIG. 8 is a schematic diagram of an image transmitting system according to the sixth embodiment of the disclosure.

According to yet another aspect of the embodiments of the disclosure, an image transmitting system is provided. FIG. 8 is a schematic diagram of the image transmitting system according to the sixth embodiment of the disclosure. As shown in FIG. 8, the image transmitting system includes: a multimedia player box 82 and a display device 84. The multimedia player box 82 includes: a display controller and a sending card. The display controller is configured to process the data to be transmitted according to the first resolution to obtain the first image data, and fold the first image data to obtain the second image data. The image resolution represented by each row of image data in the first image data is the first resolution, and the first resolution is the maximum resolution set by the system. The number of rows of the second image data is greater than that of the first image data, the image resolution represented by each row of image data in the second image data is the second resolution, and the second resolution is less than the first resolution. The sending card is connected to the display controller and configured to splice every n rows of image data in the second image data to restore the data to the first image data, and send the first image data after restoration. The display device 84 includes: a receiving card and a display. The receiving card is configured to receive the first image data, and decode the first image data to obtain the first image data to be displayed. The image resolution represented by each row of image data in the first image data is the first resolution, and the first resolution is the maximum resolution set by the system. The display is connected to the receiving card and configured to display the first image data.

The multimedia player box 82 sets the maximum resolution in the Android system, so that the multimedia player, which originally supports the length of 1920 pixels, renders the data to be transmitted through the frame buffer according to the maximum resolution to obtain the data to be transmitted with the length of 3840 pixels. But because the LCDC of the multimedia player only supports data extraction and timing conversion with the length of 1920 pixels, in order to ensure that the data to be transmitted with the length of 3840 pixels can be output smoothly, the data to be transmitted with the length of 3840 pixels are split into two rows of data with the length of 1920 pixels, thereby overcoming the problem of limited display of the LED display screen due to the load limitation of hardware devices. Because the data are split into two rows of data with the length of 1920 pixels at the LCDC, in order to achieve the ultra-long display on the LED display screen (that is, the display device in the embodiments of the disclosure), two rows of data with the length of 1920 pixels are combined through FPGA to obtain the data to be transmitted with the length of 3840 pixels, and the data to be transmitted with the length of 3840 pixels are sent to the display device, so as to achieve the effect of doubling the resolution and the function of LED ultra-long display.

The display device 84 receives, through the FPGA receiving card, the data to be transmitted at the first resolution sent by the multimedia player box, decodes the data to be transmitted at the first resolution through the FPGA receiving card to obtain the data to be transmitted at the first resolution for display, and then drives, through the FPGA receiving card, the LED display screen to display the data to be transmitted at the first resolution for display, thereby achieving the ultra-long display.

It is to be noted that the embodiments of the disclosure are illustrated only taking the multimedia player box, the chip in which supports the resolution 1920×1080, as an example. In addition, the multimedia player box, the chip in which supports the resolution 4096×2160 (that is, 4K definition) is also applicable to the image transmitting system provided in the embodiments of the disclosure. If the image transmitting system provided in the embodiments of the disclosure is used, the resolution can be improved to 8192×1080, so the image transmitting system provided in the embodiments of the disclosure is only illustrated with the above example, which is subject to implementing the image transmitting system provided in the embodiments of the disclosure, without any specific restrictions.

Seventh Embodiment

According to another aspect of the embodiments of the disclosure, a non-transitory storage medium is provided, which includes a stored program. When running, the program controls a device where the non-transitory storage medium is to execute the method for processing Image in the first embodiment or the second embodiment.

Eighth Embodiment

According to another aspect of the embodiments of the disclosure, a processor is provided, which is configured to run a program stored in a storage medium. When running, the program executes the method for processing Image in the first embodiment or the second embodiment.

The sequence numbers of the embodiments of the disclosure are just for describing, instead of representing superiority-inferiority of the embodiments.

In the above embodiments of the disclosure, the descriptions of the embodiments focus on different aspects. A part which is not described in a certain embodiment in detail may refer to the related description of the other embodiments.

In the several embodiments provided in the disclosure, it should be understood that the technical contents disclosed may be realized in other ways. The embodiment of the device described above is only schematic; for example, the division of the units is only a division of logical functions, and there may be other dividing modes during the actual implementation, for example, multiple units or components may be combined or integrated to another system, or some features may be ignored or are not executed. In addition, coupling, direct coupling, or communication connection shown or discussed may be implemented through indirect coupling or communication connection of some interfaces, units or modules, and may be in an electrical form or other forms.

The units described as separate parts may be or may not be separate physically. The part shown as the unit may be or may not be a physical unit, that is to say, it may be in a place or distributed on multiple network units. Part or all of the units may be selected to achieve the purpose of the solutions of the embodiments according to a practical requirement.

Moreover, all the function units in the embodiments of the disclosure may be integrated in a processing unit; or the units exist separately and physically; or two or more than two units are integrated in a unit. The integrated unit may be realized in form of hardware or in form of software function unit.

If the integrated unit is implemented by software function modules, and the software function modules are sold or used as independent products, they can also be stored in a computer readable storage medium. Based on this understanding, the technical solution of the embodiments of the disclosure substantially or the part making a contribution to the conventional art can be embodied in the form of software product; the computer software product is stored in a storage medium, and includes a number of instructions to make a computer device (which may be a personal computer, a server or a network device, etc.) perform all or part of steps of the method in each embodiment of the disclosure. The storage media include, but not limited to, a USB flash disk, an ROM, an RAM, a mobile hard disk, a magnetic disk, a compact disc, and other media capable of storing the program codes.

The above is only the preferred embodiments of the disclosure; it should be indicated that, on the premise of not departing from the principles of the disclosure, those of ordinary skill in the art may also make a number of improvements and supplements, and these improvements and supplements should fall within the protection scope of the disclosure.

What is claimed is:

1. A method for processing Image, comprising:
   processing data to be transmitted according to a first resolution to obtain first image data, wherein the image resolution represented by each row of image data in the first image data is the first resolution, and the first resolution is the maximum resolution set by a system; and
   folding the first image data to obtain second image data, wherein the number of rows of the second image data is greater than that of the first image data, the image resolution represented by each row of image data in the second image data is a second resolution, and the second resolution is less than the first resolution;
   wherein folding the first image data to obtain the second image data specifically comprises: obtaining 1/n of the length of the first resolution and n times the height of the first resolution to obtain the second resolution; extracting the second image data, the image resolution represented by which is the second resolution, from the image resolution represented by which is the second resolution; or, obtaining 1/n of the height of the first resolution and n times the length of the first resolution to obtain the second resolution; extracting the second image data, the image resolution represented by which is the second resolution, from the first image data according to the second resolution.

2. The method as claimed in claim 1, wherein the sum of the image resolutions represented by every n rows of image data in the second image data is equal to the first resolution, where n is a positive integer greater than or equal to 2.

3. The method as claimed in claim 1, wherein processing the data to be transmitted according to the first resolution to obtain the first image data comprises:
   setting the resolution of a frame buffer to the first resolution;
   performing layer overlapping on the data to be transmitted according to the first resolution to obtain the first image data; and
   storing the first image data to the frame buffer.

4. The method as claimed in claim 3, wherein performing layer overlapping on the data to be transmitted according to the first resolution to obtain the first image data comprises:
   obtaining at least two frames of data to be transmitted; and
   performing image rendering on each row of image data in the at least two frames of data to be transmitted according to the first resolution to obtain the first image data, the image resolution represented by each row of image data in which is the first resolution.

5. The method as claimed in claim 1, further comprising:
   splicing every n rows of image data in the second image data to restore the data to the first image data, and sending the first image data after restoration.

6. The method as claimed in claim 5, wherein splicing every n rows of image data in the second image data to restore the data to the first image data specifically comprises:
   storing valid data in each row of the image data in the second image data to a memory;
   obtaining the valid data in each row of the image data according to a preset row relationship to obtain at least one group of n rows of interrelated valid data; and
   combining the n rows of interrelated valid data in each group into one row, and obtaining through restoration the first image data, the image resolution represented by which is the first resolution.

7. The method as claimed in claim 6, wherein combining the n rows of interrelated valid data in each group into one row specifically comprises:
   obtaining the n times the length and 1/n of the height of the second resolution to obtain the first resolution; and
   extracting the n rows of interrelated valid data in each group according to the first resolution to obtain a row of image data, the image resolution represented by which is the first resolution;
   or, obtaining the 1/n of the length and n times the height of the second resolution to obtain the first resolution; and extracting the n rows of interrelated valid data in each group according to the first resolution to obtain a row of image data, the image resolution represented by which is the first resolution.

8. A non-volatile storage medium, comprising a program stored, wherein when running, the program controls a device where the non-volatile storage medium is to execute the method for processing Image as claimed in claim 1.

9. An image transmitting device, comprising:
- a display controller, configured to process data to be transmitted according to a first resolution to obtain first image data, wherein the image resolution represented by each row of image data in the first image data is the first resolution, and the first resolution is the maximum resolution set by a system, and fold the first image data to obtain second image data, wherein the number of rows of the second image data is greater than that of the first image data, the image resolution represented by each row of image data in the second image data is a second resolution, and the second resolution is less than the first resolution; and
- a sending card, connected to the display controller and configured to splice every n rows of image data in the second image data to restore the data to the first image data, and send the first image data after restoration; wherein the display controller is configured to obtain 1/n of the length of the first resolution and n times the height of the first resolution to obtain the second resolution; extract the second image data, the image resolution represented by which is the second resolution, from the image resolution represented by which is the second resolution; or, obtain 1/n of the height of the first resolution and n times the length of the first resolution to obtain the second resolution; and extract the second image data, the image resolution represented by which is the second resolution, from the first image data according to the second resolution.

10. An image transmitting system, comprising: an image transmitting device as claimed in claim 9 and a display device, wherein the image transmitting device comprises: a display controller and a sending card; the display controller is configured to process data to be transmitted according to a first resolution to obtain first image data, wherein the image resolution represented by each row of image data in the first image data is the first resolution, and the first resolution is the maximum resolution set by the system, and fold the first image data to obtain second image data, wherein the number of rows of the second image data is greater than that of the first image data, the image resolution represented by each row of image data in the second image data is a second resolution, and the second resolution is less than the first resolution; the sending card is connected to the display controller and configured to splice every n rows of image data in the second image data to restore the data to the first image data, and send the first image data after restoration;

the display device comprises: a receiving card and a display; the receiving card is configured to receive the first image data, wherein the image resolution represented by each row of image data in the first image data is the first resolution, and the first resolution is the maximum resolution set by the system, and decode the first image data to obtain the first image data to be displayed; the display is connected to the receiving card and configured to display the first image data.

11. The device as claimed in claim 9, wherein the sum of the image resolutions represented by every n rows of image data in the second image data is equal to the first resolution, where n is a positive integer greater than or equal to 2.

12. The device as claimed in claim 9, the display controller is configured to set the resolution of a frame buffer to the first resolution; perform layer overlapping on the data to be transmitted according to the first resolution to obtain the first image data; and store the first image data to the frame buffer.

13. The device as claimed in claim 12, herein the display controller is configured to obtain at least two frames of data to be transmitted; and perform image rendering on each row of image data in the at least two frames of data to be transmitted according to the first resolution to obtain the first image data, the image resolution represented by each row of image data in which is the first resolution.

14. The device as claimed in claim 9, wherein the sending card is configure to store valid data in each row of the image data in the second image data to a memory; obtain the valid data in each row of the image data according to a preset row relationship to obtain at least one group of n rows of interrelated valid data; and combining the n rows of interrelated valid data in each group into one row, and obtaining through restoration the first image data, the image resolution represented by which is the first resolution.

15. The device as claimed in claim 14, wherein the sending card is configured to obtain the n times the length and 1/n of the height of the second resolution to obtain the first resolution; and extract the n rows of interrelated valid data in each group according to the first resolution to obtain a row of image data, the image resolution represented by which is the first resolution; or, obtain the 1/n of the length and n times the height of the second resolution to obtain the first resolution; and extract the n rows of interrelated valid data in each group according to the first resolution to obtain a row of image data, the image resolution represented by which is, the first resolution.

* * * * *